United States Patent
Kanehira et al.

[11] Patent Number: 6,159,122
[45] Date of Patent: Dec. 12, 2000

[54] SILENT CHAIN

[75] Inventors: Makoto Kanehira; Kenshi Suzuki; Masao Maruyama; Takayuki Funamoto; Shigekazu Fukuda; Hitoshi Ohara, all of Saitama-ken, Japan

[73] Assignee: Tsubakimoto Chain Co., Osaka, Japan

[21] Appl. No.: 09/345,388

[22] Filed: Jun. 30, 1999

[30] Foreign Application Priority Data

Jun. 30, 1998 [JP] Japan ................................. 10-184511

[51] Int. Cl.[7] .................................................. F16G 13/04
[52] U.S. Cl. ............................................................ 474/212
[58] Field of Search .................................. 474/212, 155, 474/213, 214, 215, 229

[56] References Cited

U.S. PATENT DOCUMENTS

| | | | |
|---|---|---|---|
| 1,919,768 | 7/1933 | Brandt | 474/213 X |
| 4,759,740 | 7/1988 | Cradduck | 474/212 |
| 4,915,675 | 4/1990 | Avramidis | 474/213 |
| 5,114,384 | 5/1992 | Tsuyama | 474/212 |
| 5,267,910 | 12/1993 | Maruyama et al. | 474/212 |
| 5,453,059 | 9/1995 | Avramidis et al. | 474/212 |
| 5,628,702 | 5/1997 | Kotera | 474/213 |

FOREIGN PATENT DOCUMENTS

| | | |
|---|---|---|
| 2-118231 | 1/1990 | Japan . |
| 5-71818 | 8/1993 | Japan . |

*Primary Examiner*—Rodney H. Bonck
*Attorney, Agent, or Firm*—Armstrong, Westerman, Hattori, McLeland & Naughton

[57] ABSTRACT

Link plates connected together by connecting members to form an endless silent chain each include a pair of teeth and a pair of connecting holes each receiving therein one of the connecting members. The teeth each have an outer flank, an arcuate tip end portion, and an inner flank. The outer flank has a rectilinear tooth face having an intermeshing point, and a tooth length extending from the intermeshing point toward a tip end of each tooth. The tooth length is 5 to 15% of a pitch between the connecting members. The tip end portion has a first arc adjacent to the outer flank and a second arc adjacent to the inner flank, the second arc having a smaller radius of curvature than the first arc. The shortest distance from a junction between the first and second arcs of the arcuate tip end portion to a face angle forming line of the outer flank is 0.5 to 3.0% of the pitch between the connecting members. With this construction, the silent chain can decrease a collision speed with respect to the tooth face of a sprocket at the time of intermeshing to thereby reduce noises, and provide a smooth and positive intermeshing with the sprocket.

2 Claims, 4 Drawing Sheets

SILENT CHAIN

FIELD OF THE INVENTION

The present invention relates to a silent chain having a link plate capable of reducing noises generated when meshing with a sprocket.

DESCRIPTION OF THE RELATED ART

Conventionally, silent chains used for an engine or the like employ a link plate improved in various ways to reduce noises generated during operation. Conventional improvements are, however, not yet sufficient in view of a level required for reducing noises.

In meshing a link plate having an outer flank formed by a straight-line tooth face and a sprocket having an involute curve tooth, theoretically or geometrically, there is no deviation between the link plate and the sprocket, and no interference therebetween ought to exist. In actuality, however, interference occurs between the link plate and the sprocket, due to the manufacturing error in the chain, the elastic elongation caused by load tension, and the worn elongation, to generate noises.

FIG. 3 shows the meshing operation of a link plate B of a silent chain A relative to a sprocket S (indicated by phantom lines) rotating in the direction of the arrow. When no deviation between the link plate B and the sprocket S exists, a clearance exists between a tip end portion T of the link plate B in the midst of meshing engagement with respect to the sprocket S and the tooth face of the sprocket S opposite thereto. When load tension exerts in the direction indicated by the profiled arrow shown in FIG. 3, the link plate B in the midst of meshing is deviated in the right-hand direction due to the elastic elongation of the chain, causing interference with the sprocket S. Also when the worn elongation occurs in the chain A, a similar interfere to the above occurs. Due to the interference, a problem arises in that an unintended collision occurs between the link plate B and the sprocket S and thus generates noises.

Japanese Patent Publication No. (HEI) 5-71818 shows a silent chain using a link plate designed to improve the forgoing problem. However, in the link plate used in this silent chain, since an arcuate portion forming an outer tooth face of one link tooth is, as shown in FIG. 4, formed by an arc having the radius RO about the center of a connecting hole of the other link tooth, the arcuate portion forming the tip end portion of the link tooth is relatively small in length. Accordingly, the interference with the sprocket cannot be completely avoided so that smooth meshing engagement cannot be achieved. Therefore, the speed of collision with the tooth face of the sprocket cannot be sufficiently reduced, resulting in insufficient noise reduction effect. A further problem is that the disclosed link plate cannot sufficiently cope with the elastic elongation of the chain itself caused by load tension, the deviation of intermeshing of the link plate caused by load tension, the deviation in intermeshing caused by the wear of a chain and a sprocket, which result in noises generated when intermeshing with the sprocket.

SUMMARY OF THE INVENTION

It is therefore an object of the present invention to provide a silent chain which can reduce the collision speed at the time of intermeshing between a link plate and a sprocket to thereby reduce noises, and can provide smooth and positive meshing between the link plate and sprocket.

For achieving the aforesaid object, according to the present invention, there is provided an endless silent chain having a number of link plates connected together by connecting members, each of the link plates comprising a pair of teeth and a pair of connecting holes each receiving therein one of the connecting members. Each of the teeth has an outer flank, an arcuate tip end portion, and an inner flank. The outer flank has a rectilinear tooth face having an intermeshing point. The tip end portion has a first arc adjacent to the outer flank and a second arc adjacent to the inner flank, the second arc having a smaller radius of curvature than the first arc. The outer flank has a tooth length extending from the intermeshing point toward a tip end of each the tooth, the tooth length being 5 to 15% of a pitch between the connecting members. The shortest distance from a junction between the first and second arcs of the arcuate tip end portion to a face angle forming line of the outer flank is 0.5 to 3.0% of the pitch between the connecting members.

The link plates may comprise a first group of link plates having a first intermeshing pitch between the intermeshing points of the respective outer flanks of each of the first group of link plates, and a second group of link plates having a second intermeshing pitch between the intermeshing points of the respective outer flanks of each of the second group of link plates. The first intermeshing pitch is different to the second intermeshing pitch, and the first and second groups of link plates are arranged at random in a longitudinal direction of the silent chain.

The term "intermeshing point" is used herein to refer to a contact point on the outer flank of the link plate with respect to the tooth face of the sprocket when the link plate is completely meshed with the sprocket having an involute curve tooth, that is, when it is completely seated on the tooth face of the sprocket. A position of the intermeshing point is determined according to the number of teeth of a sprocket that can be meshed with the silent chain. Further, the term "pitch between connecting members" means a mutual spacing between connecting members inserted into the pair of connecting holes formed in the link plate. Thus, this pitch is substantially identical to a pitch between the connecting holes. The term "intermeshing pitch" is used herein to refer to a mutual spacing between both left and right intermeshing points with respect to the tooth face of the sprocket in the state that the link plate is completely seated on the tooth face of the sprocket.

The link plate used in the silent chain of the present invention has a basic contour or profile in which the inner flank is not meshed with the tooth face of the sprocket having the involute curve tooth but only the outer flank is engaged therewith. That is, the outer flank has the straight-line or rectilinear tooth face. It is essential that the tooth length extending from the intermeshing point of the rectilinear tooth face toward a tip end of the tooth is 5 to 15% of the pitch between connecting members in fulfilling a function of relieving the intermeshing shock. When the pitch between connecting members is less than 5%, contact stress at the intermeshing point excessively increases so that the position of the intermeshing point of the link plate with respect to the tooth face of the sprocket and the intermeshing attitude of the link plates during intermeshing are materially unstable. On the other hand, when the pitch between connecting members exceeds 15%, the arcuate tip end of a tooth adjacent to the outer flank interferes with the tooth face of the sprocket so that the speed of collision with the tooth face of the sprocket also increases not only to excessively generate noises but also to materially increase wear of the arcuate tooth point portion, thus lowering the durability of the chain.

Preferably, the inner flank is formed with a straight-line or rectilinear tooth face and an arcuate bottom surface continuous to the rectilinear tooth face in order to avoid the intermeshing with the tooth face of the sprocket having the involute curve tooth. The radius of curvature of the arcuate bottom surface is made as large as possible in order to minimize stress generated by transmission tension of the chain.

The shortest distance from the junction between the first arc of the arcuate tip end portion adjacent to the outer flank and the second arc of the arcuate tooth point portion adjacent to the inner flank to a face angle forming line of the outer flank is 0.5 to 3.0% of the pitch between the connecting members. When less than 0.5% of the pitch between the connecting members, the interference between the arcuate tip end portion of the link plate and the tooth face of the sprocket cannot be avoided to excessively generate noises. When exceeding 3.0% of the pitch between the connecting members, the arcuate tip end portion will not slidably contact the tooth face of the sprocket during intermeshing, failing to exhibit a smooth tooth-face guiding function of the link plate with respect to the sprocket.

Needless to say, as a connecting member used for the silent chain of the present invention, both a rocker pin and a round pin can be used.

The silent chain according to the present invention exhibits a so-called tooth-face guiding function, which provides a guide so that when starting intermeshing with the sprocket, the second arc of the arcuate tooth point portion first slidably contacts without interfering with the tooth point of the tooth face of the sprocket, the first arc of the arcuate tooth point portion then passes through the intermeshing point while slidably contacting without interfering with the tooth face of the sprocket. At the same time, the first arc guides the rectilinear tooth face of the outer flank into sliding contact with the tooth face of the sprocket without interference. When the first arc of the arcuate tip end portion is disengaged from the tooth face of the sprocket while the rectilinear tooth face of the outer flank is in slide contact with the tooth face of the sprocket, the rectilinear tooth face of the outer flank and the tooth face of the sprocket achieve a predetermined intermeshing at the intermeshing point, and the rectilinear tooth face of the outer flank continues its engagement with the tooth face of the sprocket until the link plate is disengaged from the sprocket to transmit power.

Particularly, the silent chain according to the present invention exhibits a so-called intermeshing shock relieving function, in which even if in the normal using state, the elastic elongation or worn elongation occurs in the chain itself, the collision speed with respect to the sprocket can be reduced, and the contact stress at the intermeshing point can be reduced while avoiding the excessive interference with the arcuate tip end portion of the link plate and the tooth face of the sprocket having the involute curve tooth.

Further, in the silent chain according to the present invention, two groups of link plates having different intermeshing pitches of the outer flank are arranged at random in a longitudinal direction of the chain. This arrangement exhibits a so-called noise dispersing function, in which intermeshing sounds are dispersed at random.

The above and other objects, features and advantages of the present invention will become apparent to those versed in the art upon making reference to the following detailed description and the accompanying sheets of drawings in which certain preferred structural embodiments incorporating the principle of the present invention are shown by way of illustrative examples.

DETAILED DESCRIPTION OF THE PREFERRED EMBODIMENTS

Figure 1:
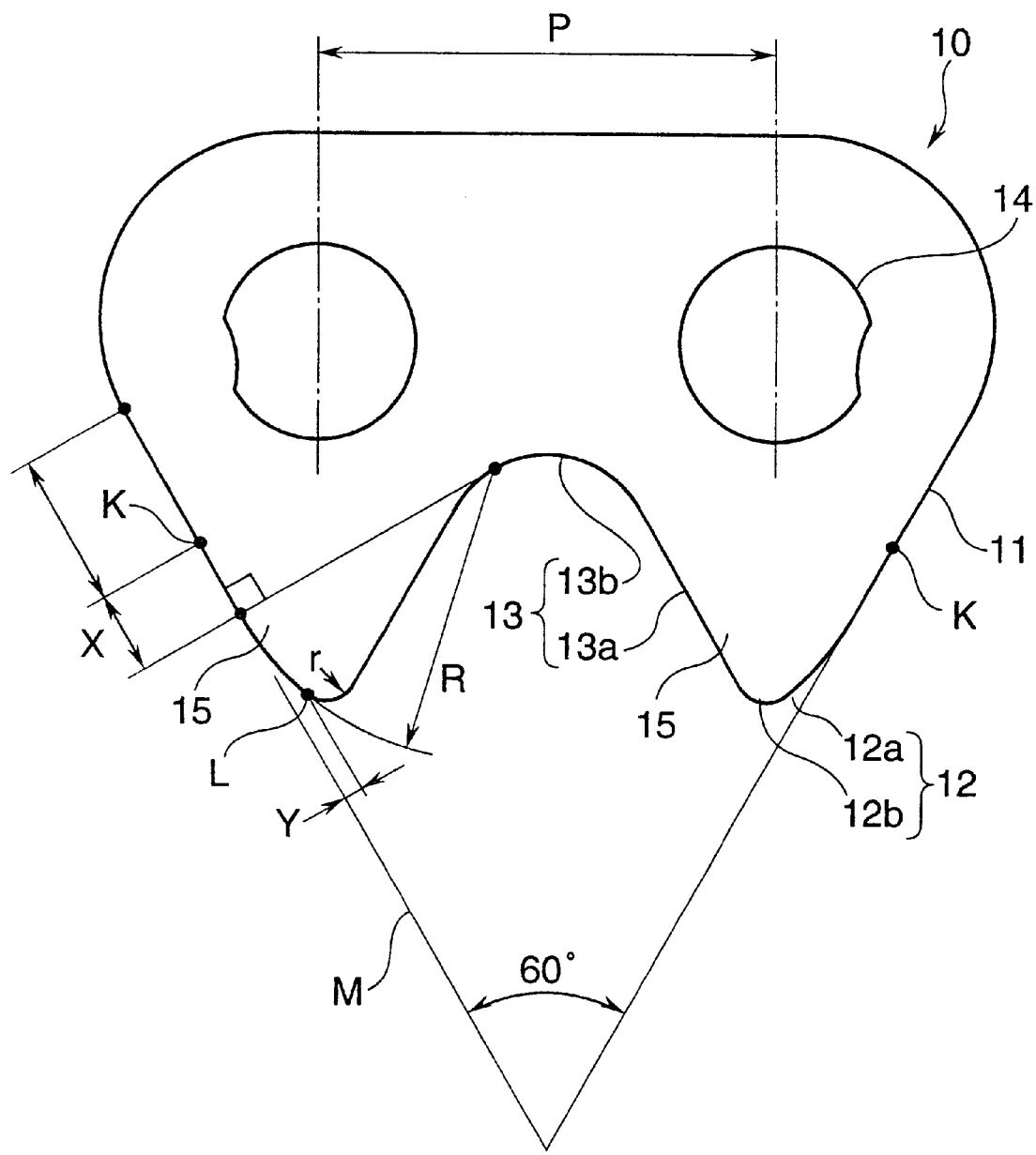
FIG. 1 is a plan view of a link plate used in a silent chain according to an embodiment of the present invention.

Referring to FIG. 1, there is shown a link plate of a silent chain according to an embodiment of the present invention. A link plate 10 has a pair of teeth 15, 15 and a pair of connecting holes 14 for receiving connecting members (not shown). Each of the teeth 15 is formed by an outer flank 11, an arcuate tip end portion 12, and an inner flank 13. A large number of the link plates 10 are connected together by the connecting members so as to form a silent chain of the present invention which is flexibly bendable and has a continuous loop-shaped configuration. As is well known, the connecting members are comprised of connecting pins such as rocker pins, or round pins.

The outer flank 11, the arcuate tooth point portion 12, and the inner flank 13 respectively provided on the link plate 10 will now be described in detail.

Figure 3:
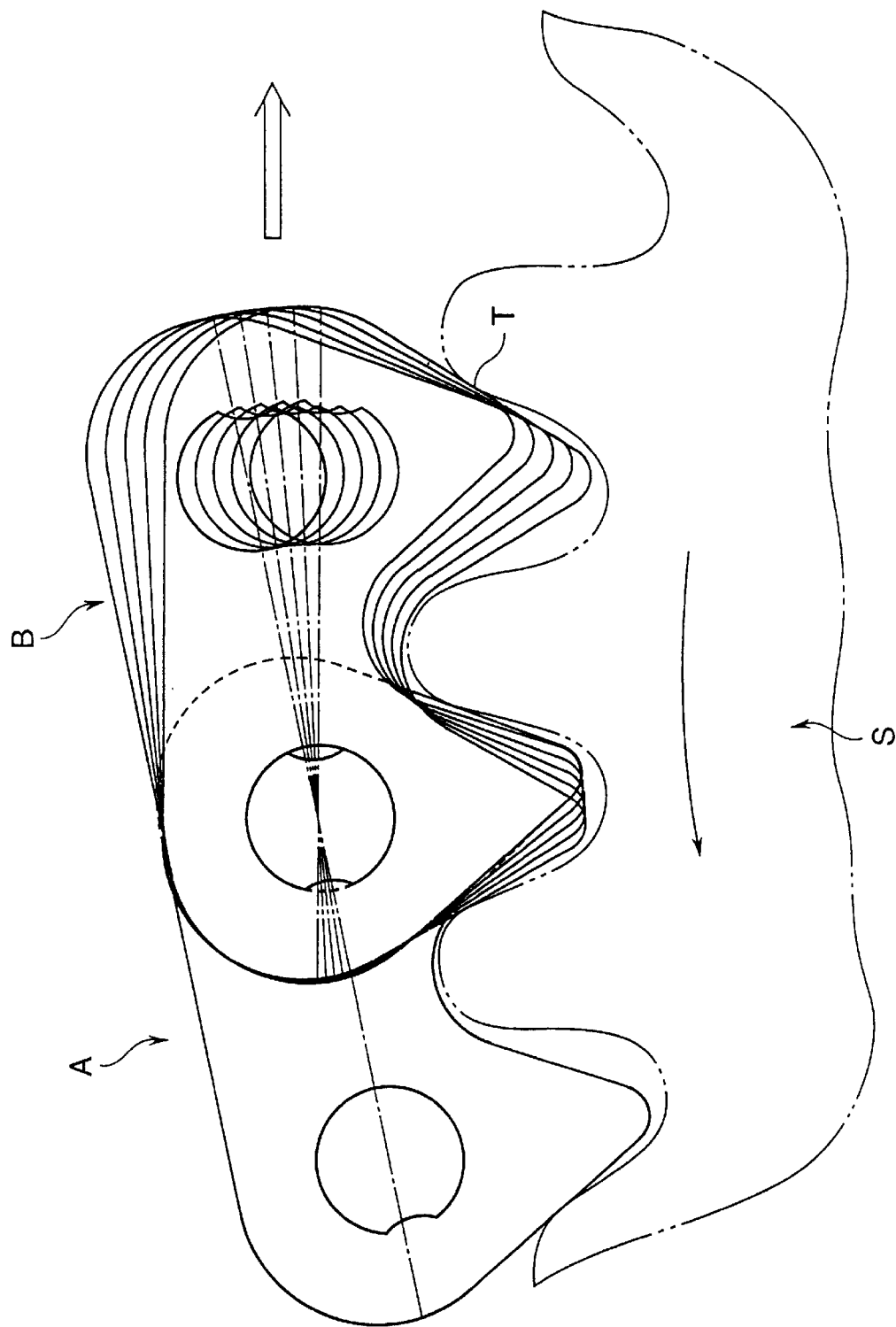
FIG. 3 is a view showing intermeshing operation of a link plate of a conventional silent chain with respect to a sprocket.

First, the outer flank 11 has a straight-line or rectilinear tooth face having an intermeshing point K. A tooth length X of the outer flank 11, which extends from the intermeshing point K of the straight-line tooth face toward a tip end of each tooth 15, is 5 to 15% of a pitch P between the connecting members (i.e., between the connecting holes 14). The inner flank 13 is formed with a straight-line or rectilinear tooth face 13a and an arcuate bottom surface 13b continuous to the straight-line tooth face 13a in order to avoid meshing with tooth faces of a sprocket having an involute curve tooth. The sprocket is not shown in FIG. 1 but identical to the sprocket S shown in FIG. 3. In order to minimize stress generated by transmission tension of the chain, the radius of curvature of the arcuate bottom surface 13b is made as large as possible within a range which is compatible with formation of the pair of teeth 15.

Next, the arcuate tip end portion 12 adjacent to the outer flank 11 has a small arc (first arc) 12a and a fine arc (second arc) 12b having a radius r of curvature much smaller than that R of the small arc (first arc) 12a. The small arc 12a is smoothly adjoining at opposite ends to the outer flank 11 and the fine arc 12b, respectively. The fine arc 12b is smoothly adjoining at opposite ends to the small arc 12a and the inner flank 13, respectively. The shortest distance Y from a junction L between the small arc 12a and the fine arc 12b to a face angle forming line M of the outer flank 11 is 0.5 to 3.0% of the pitch P between connecting members (connecting holes 14).

The silent chain having the link plates 10 of the foregoing construction operates as follows. When the silent chain starts meshing with the sprocket (see FIG. 3), the fine arc 12b of the arcuate tip end portion 12 of the tooth 15 first comes into sliding contact with the tooth face at the tip end portion of a tooth of the sprocket without interference, and the small arc 12a of the arcuate tip end portion 12 then passes through the intermeshing point K while sliding on the tooth face of the sprocket without interference S. At the same time, the small arc 12a guides the rectilinear tooth face of the outer flank 11 into sliding contact with the tooth face of the sprocket S without interference. When the small arc 12a of the arcuate tip end portion 12 is disengaged from the tooth face of the sprocket while the rectilinear tooth face of the outer flank 11 is still in sliding contact with the tooth face of the sprocket S, the rectilinear tooth face of the outer flank 11 and the tooth face of the sprocket completely achieve a predetermined intermeshing at the intermeshing point K. The rectilinear tooth face of the outer flank 11 is continuously engaged with the tooth face of the sprocket S to achieve transmission of power until the link plate 10 is disengaged from the sprocket.

The relationship between the collision speed V (mm/s) when the silent chain is meshed with the sprocket, the tooth length X (mm) and the shortest distance Y (mm) was analyzed by a computer, results of which is shown in Table 1 below.

TABLE 1

RESULTS OF COMPUTER ANALYSIS

Figure 4:
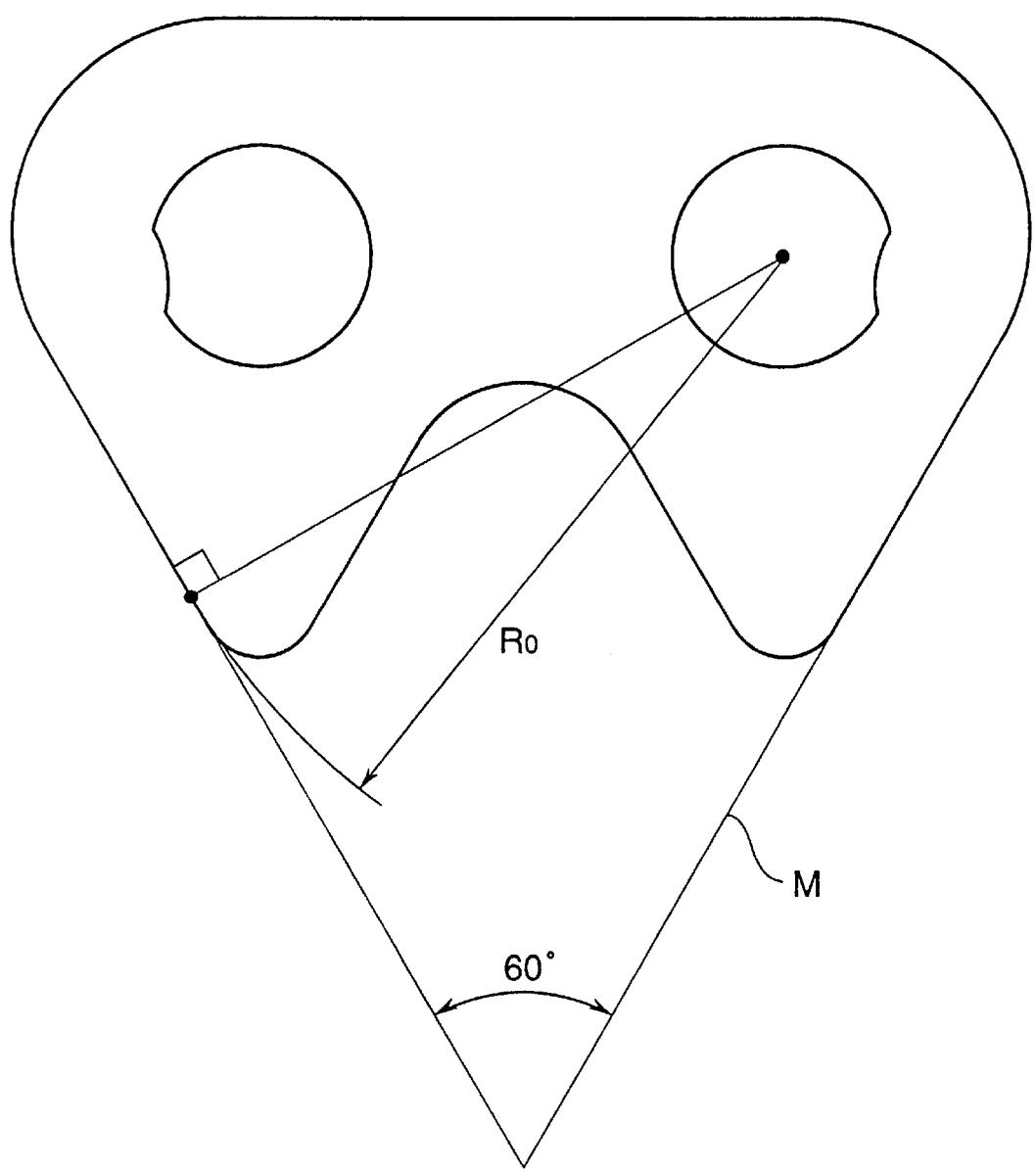
FIG. 4 is a plan view of the link plate used in the conventional silent chain.

| Shape of link plate | X/P (%) | Y/P (%) | Collision speed V |
|---|---|---|---|
| Prior Art 1 (with Rectilinear Tooth) | 100 | 0 | 46 |
| Prior Art 2 (see FIG. 4) | 27 | 0.27 | 33 |
| Present Embodiment | 12 | 1.20 | 11 |

In achieving the foregoing analysis, the link plates of silent chains according to the Prior Art 1, Prior Art 2 and Present Embodiment are used under the conditions that the pitch P between connecting members (connecting holes)= 9.525 mm, the pressure angle of link plate=30 degrees, the number of teeth of a drive sprocket=30, the number of teeth of a driven sprocket=30, the rotational speed of a sprocket= 100 rpm, and the load tension=3.1 KN.

The three silent chains each stretched between the drive and drive sprockets both having thirty teeth were driven at 3000 rpm to achieve a noise test, results of which are shown in Table 2 below.

TABLE 2

RESULTS OF NOISE TEST

| | Noise (dB) | Evaluation (Difference from Prior Art 1) |
|---|---|---|
| Prior Art 1 (with Rectilinear Tooth) | 90 | — |
| Prior Art 2 (see FIG. 4) | 89 | 1 |
| Present Embodiment | 85 | 5 |

It appears from Table 2 that the silent chain according to the Present Embodiment exhibits an intermeshing shock relieving function capable of reducing the collision speed with respect to the sprocket and of reducing the contact stress at the intermeshing point K, and a tooth face guiding function capable of guiding the outer flank 11 into smooth sliding contact with the tooth face of the sprocket by the arcuate tip end portion of the tooth. It is, therefore, possible to reduce noises caused by sliding contact at the beginning of intermeshing, and noises caused by sliding contact during intermeshing, achieve smooth and positive intermeshing, and stabilize a position of the intermeshing point K and an intermeshing attitude of a link plate at the time of intermeshing. Thus, the silent chain can exhibit an excellent wear resistance.

Figure 2:
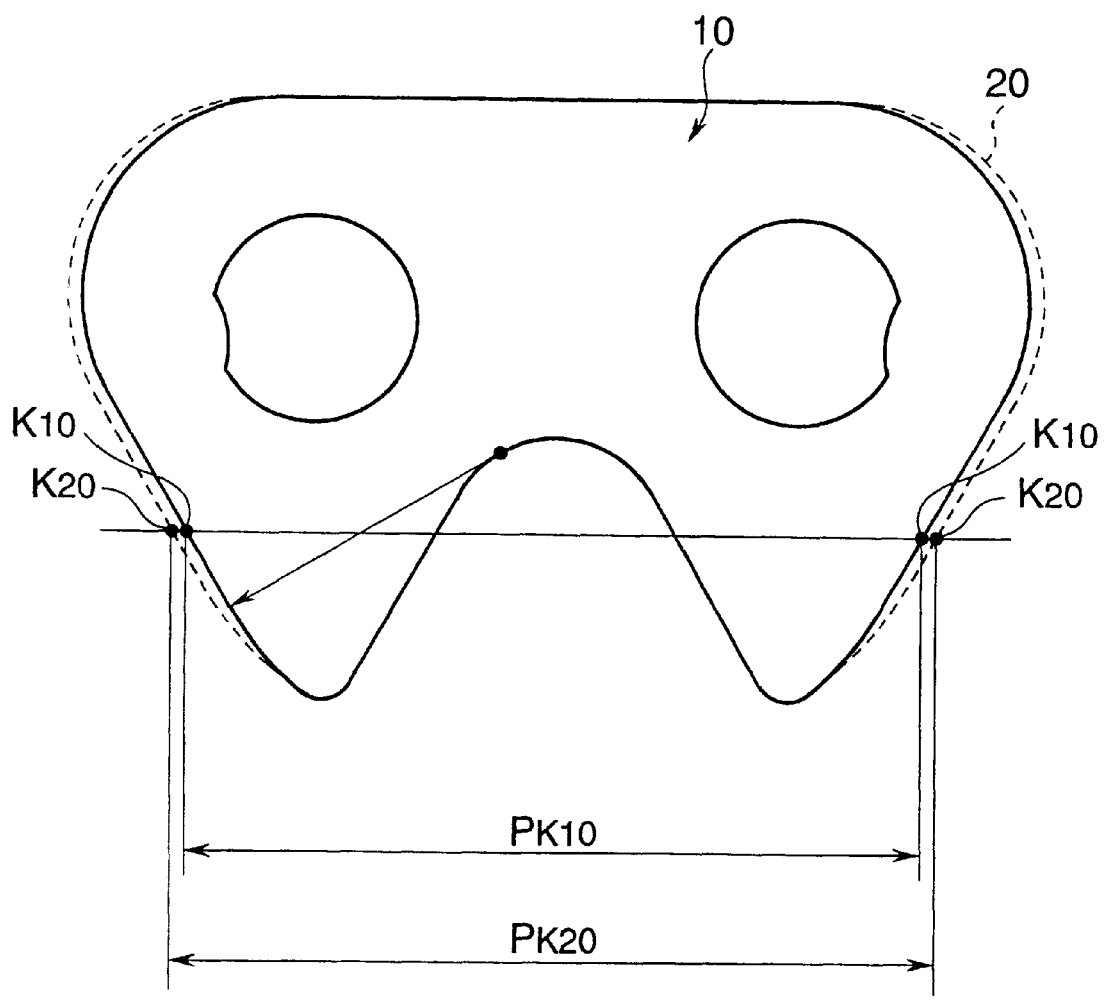
FIG. 2 is a plan view of two kinds of link plates used in a silent chain according to another embodiment of the present invention.

FIG. 2 shows link plates of silent chains according to another embodiment of the present invention. In this embodiment, a link plate 10 having an intermeshing pitch Pk10 and a link plate 20 (shown by broken lines) having a larger intermeshing pitch Pk20 than the link plate 10 are placed one above the other in order to clarify a dimensional relationship therebetween. It is noted that both the link plates 10, 20 differ from each other only in the intermeshing pitch Pk, and they have the same basic structure as the link plate of the silent chain according to the first embodiment described previously with reference to FIG. 1.

In a silent chain according to another embodiment of the present invention, the link plates 10 whose intermeshing pitch is Pk10 and the link plates 20 whose intermeshing pitch is Pk20 are arranged at random in a longitudinal direction of the chain.

The silent chain according to another embodiment of the present invention thus obtained not only can achieve a noise reducing effect similar to that of the silent chain mentioned previously but also achieves a noise dispersing function capable of dispersing at random intermeshing sounds of the link plates 10 and 20 adjacent to one another so that a periodical concentration of intermeshing sounds can be eliminated, thus enabling reduction of noises as a whole of the chain.

The silent chains according to the present invention thus obtained can exhibit the following advantageous effects:

1) Since the tooth length extending from an intermeshing point on the rectilinear tooth face of an outer flank toward a tip end of tooth is 5 to 15% of a pitch between connecting members, the silent chain can exhibit an intermeshing shock relieving function capable of reducing a collision speed with respect to the tooth face of the sprocket and reducing contact stress at the intermeshing point. This makes it possible to reduce noises caused by a sliding contact at the time of intermeshing, stabilize an intermeshing position of link plates with respect to the tooth face of the sprocket and an intermeshing attitude of link plates at the time of intermeshing. Thus, the silent chain can exhibit an excellent wear resistance.

2) Because the shortest distance from a junction between a small arc and a fine arc of an arcuate tip end portion of each tooth to a face angle forming line of the outer flank is 0.5 to 3.0% of the pitch between connecting members, the silent chain can exhibit a tooth face guiding function capable of guiding the rectilinear tooth face of the outer flank into smooth sliding contact with the tooth face of the sprocket by the small arc of the arcuate tip end portion. It is therefore possible to achieve a smooth and positive intermeshing, thus enabling reduction of noises caused by the sliding contact at the beginning of intermeshing. Particularly, even if a slight deviation occurs between the link plate and the sprocket due to a manufacturing error of the chain, an elastic elongation caused by load tension, and a worn elongation, the small arc of the arcuate tip end portion exhibits a tooth face guiding function to thereby enable avoidance of interference which possibly occurs between the sprocket and the link plate. It is therefore possible to suppress noises caused by the interference, and prevent excessive wear of the arcuate tip end portion of the tooth to thereby secure a desired degree of durability for a long period of time.

3) Two groups of link plates having different intermeshing pitches are arranged at random in a longitudinal direction of a chain to achieve a noise dispersing function capable of dispersing at random intermeshing sounds of the link plates adjacent to one another. This enables elimination of a periodical concentration of intermeshing sounds, thereby reducing noises as a whole of chain.

Obviously, various minor changes and modifications of the present invention are possible in the light of the above teaching. It is therefore to be understood that within the scope of the appended claims the present invention may be practiced otherwise than as specifically described.

What is claimed is:

1. An endless silent chain having a number of link plates connected together by connecting members, each of said link plates comprising a pair of teeth and a pair of connecting holes each receiving therein one of the connecting members, each of said teeth having an outer flank, an arcuate tip end portion, and an inner flank, said outer flank having a rectilinear tooth face having an intermeshing point, said tip end portion having a first arc adjacent to said outer flank and a second arc adjacent to said inner flank, said second arc having a smaller radius of curvature than said first arc, said outer flank having a tooth length extending from said intermeshing point toward a tip end of each said tooth, said tooth length being 5 to 15% of a pitch between the connecting members, and the shortest distance from a junction between said first and second arcs of said arcuate tip end portion to a face angle forming line of said outer flank being 0.5 to 3.0% of said pitch between the connecting members.

2. The silent chain according to claim 1, wherein said link plates comprise a first group of link plates having a first intermeshing pitch between said intermeshing points of the respective outer flanks of each of said first group of link plates, and a second group of link plates having a second intermeshing pitch between said intermeshing points of the respective outer flanks of each of said second group of link plates said first intermeshing pitch being different to said second intermeshing pitch, and said first and second groups of link plates being arranged at random in a longitudinal direction of said silent chain.

* * * * *